(12) United States Patent
Morris

(10) Patent No.: US 8,783,293 B2
(45) Date of Patent: Jul. 22, 2014

(54) SIMPLE REVERSE FLOW WYE CONNECTOR

(75) Inventor: Bruce E. Morris, Magnolia, TX (US)

(73) Assignee: Oil States Industries, Inc., Arlington, TX (US)

(*) Notice: Subject to any disclaimer, the term of this patent is extended or adjusted under 35 U.S.C. 154(b) by 657 days.

(21) Appl. No.: 13/008,661

(22) Filed: Jan. 18, 2011

(65) Prior Publication Data

US 2012/0181786 A1 Jul. 19, 2012

(51) Int. Cl.
| F16K 11/085 | (2006.01) |
| F16K 11/076 | (2006.01) |
| F16L 55/46 | (2006.01) |
| F16L 41/02 | (2006.01) |

(52) U.S. Cl.
CPC ............. *F16L 55/46* (2013.01); *F16K 11/076* (2013.01); *F16L 41/023* (2013.01)
USPC ........................................................ 137/874

(58) Field of Classification Search
USPC ........ 137/625.46, 625.47, 874, 876; 251/117, 251/352; 15/104.062
See application file for complete search history.

(56) References Cited

U.S. PATENT DOCUMENTS

| 797,547 A | 8/1905 | Bachelder |
| 1,425,635 A | 8/1922 | Dod |
| 1,753,989 A | 4/1930 | Wilhelm |
| 1,767,658 A * | 6/1930 | Fantz ............................. 137/876 |
| 2,369,849 A | 2/1945 | Phillips |
| 2,587,934 A | 3/1952 | Volpin |
| 2,931,672 A | 4/1960 | Merritt et al. |
| 3,139,932 A | 7/1964 | Johnson |
| 3,186,014 A | 6/1965 | Herbert |
| 3,278,203 A | 10/1966 | Snyder |
| 3,475,039 A | 10/1969 | Ortloff |
| 3,479,061 A | 11/1969 | Smookler et al. |
| 3,545,489 A * | 12/1970 | Brown et al. ................. 137/876 |
| 3,664,376 A | 5/1972 | Watkins |
| 3,674,123 A | 7/1972 | Lewis et al. |
| 3,860,271 A | 1/1975 | Rodgers |
| 3,955,793 A | 5/1976 | Burkhardt et al. |
| 4,045,054 A | 8/1977 | Arnold |

(Continued)

OTHER PUBLICATIONS

U.S. Patent and Trademark Office, "Office Communication," for U.S. Appl. No. 11/796,122 mailed May 11, 2010.

(Continued)

*Primary Examiner* — John Fox
(74) *Attorney, Agent, or Firm* — Richard Auchterlonie; Novak Druce Connolly Bove + Quigg LLP

(57) ABSTRACT

A body includes two separate openings on a first side of the body that correspond to separate passages that converge to a common passage. An opening on a second side of the body couples to the common passage. A bore in the body is concentric with the common passage. A diverter has at least a part of the diverter in both the bore and the common passage. A tubular portion of the diverter has an open end in fluid communication with the common passage. One or more seals are positioned circumferentially around the part of the diverter located in the bore. The diverter is selectively rotated with the drive mechanism during use to align a diverter wall opening with a selected separate passage such that an object moving from the common passage through the tubular portion of the diverter is directed into the selected separate passage during use.

26 Claims, 11 Drawing Sheets

(56) References Cited

U.S. PATENT DOCUMENTS

| | | | |
|---|---|---|---|
| 4,124,145 A * | 11/1978 | Spinner et al. ............. 222/56 |
| 4,224,986 A | 9/1980 | Rothberg |
| 4,230,299 A | 10/1980 | Pierce, Jr. |
| 4,291,724 A | 9/1981 | Miller |
| 4,372,337 A | 2/1983 | Holzenberger |
| 4,411,459 A | 10/1983 | Ver Nooy |
| 4,650,151 A | 3/1987 | McIntyre |
| H252 H | 4/1987 | Sturman |
| 4,800,927 A | 1/1989 | Torichigai et al. |
| 4,821,772 A | 4/1989 | Anderson et al. |
| 4,865,078 A | 9/1989 | Ensign |
| 4,964,612 A | 10/1990 | Maggioni et al. |
| 4,971,307 A | 11/1990 | Killerud et al. |
| 5,076,308 A | 12/1991 | Cohen |
| 5,076,319 A | 12/1991 | Salley |
| 5,082,391 A | 1/1992 | Florida |
| 5,215,112 A | 6/1993 | Davison |
| 5,307,838 A | 5/1994 | d'Agostino et al. |
| 5,368,342 A | 11/1994 | Latham et al. |
| 5,490,660 A | 2/1996 | Kamezawa |
| 5,842,816 A | 12/1998 | Cunningham |
| 5,857,715 A | 1/1999 | Gray et al. |
| 5,893,392 A | 4/1999 | Spies et al. |
| 6,142,708 A | 11/2000 | Tarlton et al. |
| 6,164,188 A | 12/2000 | Miser |
| 6,260,819 B1 | 7/2001 | Ovsepyan |
| 6,276,662 B1 | 8/2001 | Bugatti |
| 6,283,152 B1 | 9/2001 | Corte |
| 6,290,207 B1 | 9/2001 | Genga |
| 6,311,727 B1 | 11/2001 | Campau |
| 6,340,148 B1 | 1/2002 | Sung |
| 6,578,881 B2 | 6/2003 | Lynn et al. |
| 6,851,478 B2 | 2/2005 | Cornelssen et al. |
| 6,886,805 B2 | 5/2005 | Mccarty |
| 6,935,615 B2 | 8/2005 | McCarty |
| 7,891,377 B2 | 2/2011 | Morris et al. |
| 8,151,394 B2 | 4/2012 | Morris et al. |
| 8,151,825 B2 | 4/2012 | Morris |
| 8,360,155 B2 | 1/2013 | Avery et al. |
| 8,360,391 B2 | 1/2013 | Morris |
| 2003/0020034 A1 | 1/2003 | Newport et al. |
| 2004/0149951 A1 | 8/2004 | Gethmann |
| 2008/0263796 A1 | 10/2008 | Morris et al. |
| 2009/0224189 A1 | 9/2009 | Morris et al. |
| 2010/0065140 A1 | 3/2010 | Joynson et al. |
| 2010/0301597 A1 | 12/2010 | Morris et al. |

OTHER PUBLICATIONS

U.S. Patent and Trademark Office, "Office Communications" for U.S. Appl. No. 11/857,972, mailed Jan. 7, 2011 and May 11, 2011.

BKW Inc. Pig Switches web product page (www.bkwinc.com/pigging.html), date unknown; 3 pages.

Oll States Hydrotech Piggable Y Fittings web product page (www.oilstateshydrotech.com), date unkown; 1 page.

"All About Pigging" from Pipeline Design for Pigging article, date unknown; 1 page.

Bi-Directional Piggable Wye Fitting product brochure, Oceaneering International, Inc., date unknown; 2 pages.

Piggable fitting product picture, Oil States International, Inc., date unknown; 1 page.

U.S. Patent and Trademark Office, "Office Communications" for U.S. Appl. No. 12/044,705 mailed May 18, 2011 and Sep. 23, 2011.

U.S. Patent and Trademark Office, "Office Communication," for U.S. Appl. No. 13/291,816 mailed Feb. 25, 2013.

* cited by examiner

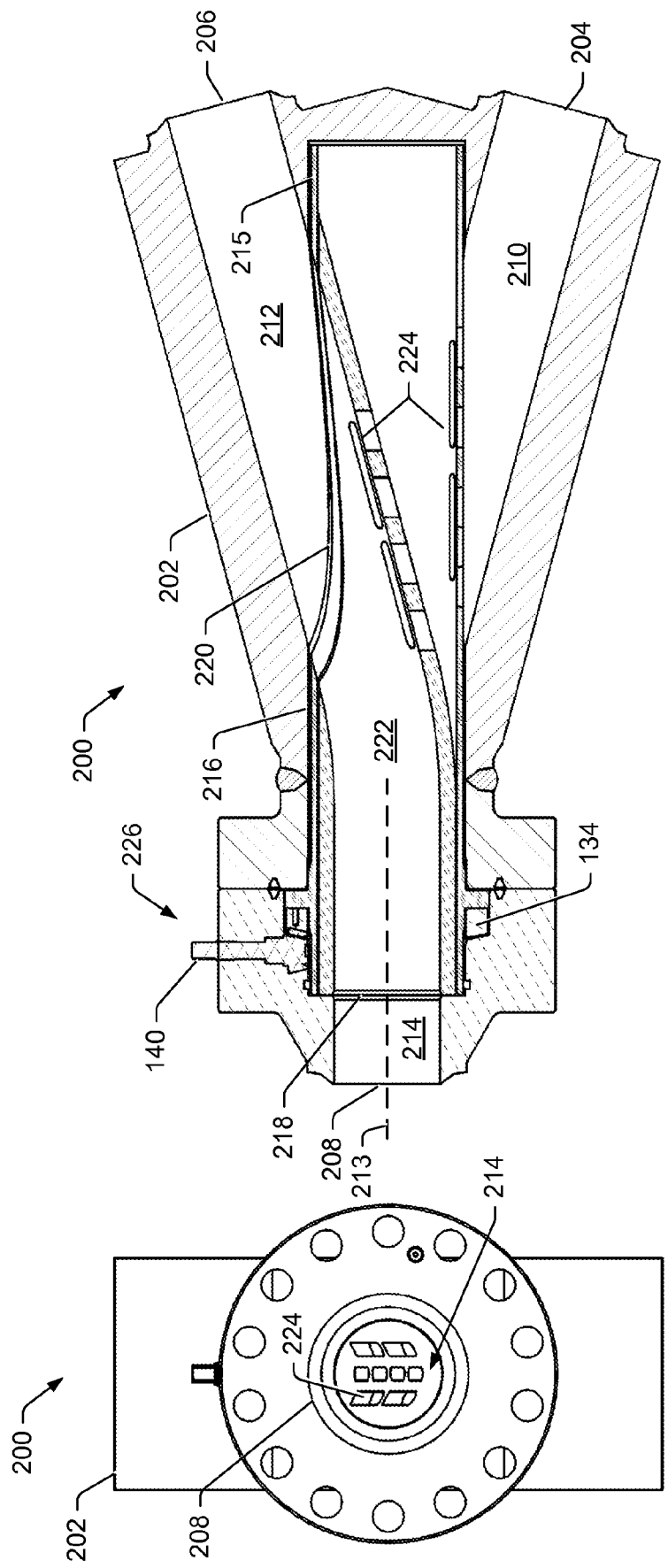

SIMPLE REVERSE FLOW WYE CONNECTOR

BACKGROUND

1. Field of the Invention

The present invention relates to subsea pipelines and connectors and/or fittings used in the pipelines. Some embodiments relate to fittings to combine and/or redirect flow in the pipelines. More particularly, the invention relates to a subsea fitting used to facilitate pigging and/or cleaning of subsea pipelines.

2. Description of Related Art

Offshore pipeline systems are a maze of connected and interconnected pipeline segments that transport hydrocarbons or related products from one point to another. The pipeline connection points initiate at the wellhead and connect to subsea manifolds, offshore structures, and, eventually, to land for final processing and distribution of the products. Due to the expenses of running dedicated pipelines from the initiating point direct to processing stations, shorter pipeline segments are joined to existing or larger pipelines to create the product pipeline from the source (e.g., the initiating wellhead) to the market (e.g., onshore stations).

Pipeline interconnects have been accommodated by placing tee-shaped fittings with a perpendicular intersect into a pipeline to create what has been known as a branch or lateral connection point. These connections provide a means of combining the product from one line with another. However, these connections do not allow for the passage of certain pigs used for cleaning and inspection, sometimes referred to as solid-mandrel, trained, or intelligent pigs. Combining the flow of two pipelines into one line to allow for pigging by all common forms of pigs requires the use of a fitting known as a piggable wye.

Piggable wye fittings have relatively shallow intersect angles, typically about 30° or less, which allow for fairly smooth transmission of long pigs and pig trains from either of the two inlet bores through the intersect and out through a common exhaust. However, if a pig is ever run into the piggable wye in a reverse direction, the pig will jam in the intersect of the wye, abnormally shutting down the pipeline.

Reverse flow of a pipeline is becoming increasingly more common. To this end, the ability to pig in the reverse flow direction is becoming a more common consideration for pipeline design. Thus, a piggable wye fitting that can be configured to suitably pass all forms of pigs in normal (e.g., combining) flow conditions and in reverse (e.g., directed) flow conditions is desirable.

SUMMARY

In certain embodiments, a fitting includes a body with at least two separate openings on a first side of the body. At least two of the separate openings on the first side couple to corresponding separate passages in the body that converge to a common passage in the body. A second side of the body, opposite from the first side of the body, has an opening. The opening couples to the common passage. A bore is in a part of the body between the at least two separate passages. The bore is concentric with the common passage.

In certain embodiments, a rotatable, longitudinal diverter is coupled to the body with at least a part of the diverter being located in both the bore and the common passage. A first end portion of the diverter is coupled to a drive mechanism on the first side of the body. A second end portion of the diverter, opposite to the first end portion, includes a tubular portion with an end of the tubular portion being open and in fluid communication with the common passage. At least part of the diverter in the bore tightly fits in the bore. One or more seals are positioned circumferentially around the part of the diverter that tightly fits in the bore.

In certain embodiments, the wall of the tubular portion of the diverter includes an opening. The diverter may be selectively rotated with the drive mechanism during use to align the diverter wall opening with a selected separate passage such that an object moving from the common passage through the tubular portion of the diverter is directed into the selected separate passage during use.

In certain embodiments, a fitting includes a body with at least two passages in the body that converge from separate openings on a first side of the body to a single opening on a second side of the body. The second side of the body is opposite from the first side of the body. A bore is in a part of the body between the at least two passages. The bore is concentric with the single opening.

In certain embodiments, a rotatable, longitudinal diverter is coupled to the body with at least a part of the diverter being located in the bore. A first end portion of the diverter is coupled to a drive mechanism on the first side of the body. A second end portion of the diverter, opposite to the first end portion, includes a tubular portion with an end of the tubular portion being open and in fluid communication with the single opening. At least part of the diverter in the bore tightly fits in the bore. One or more seals are positioned circumferentially around the part of the diverter that tightly fits in the bore.

In certain embodiments, the wall of the tubular portion of the diverter includes an opening. The diverter may be selectively rotated with the drive mechanism during use to align the diverter wall opening with a selected passage such that an object moving from the single opening through the tubular portion of the diverter is directed into the selected passage during use.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which:

FIG. 15 depicts a cross-sectional representation of an alternative embodiment of a subsea fitting.

FIG. 16 depicts an end view of the embodiment depicted in FIG. 15.

Figure 1:
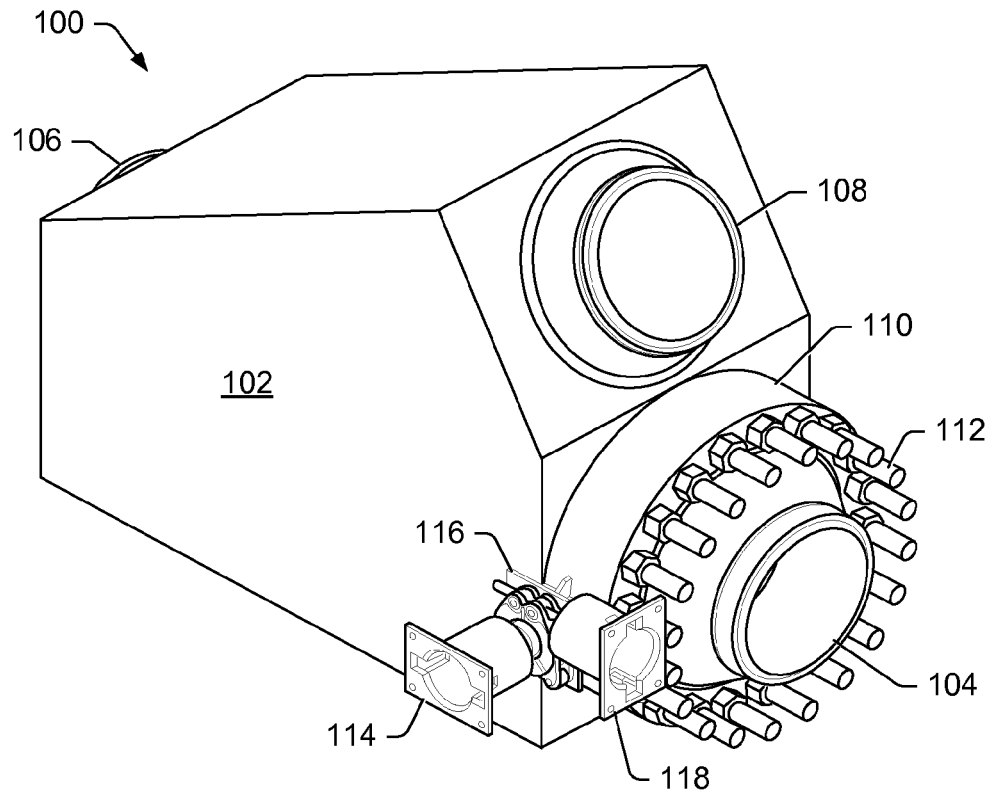
FIG. 1 depicts a perspective representation of an embodiment of a subsea fitting.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "fitting" means a fitting or connector that may be coupled into a pipeline (e.g., a subsea pipeline). The term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner. The term "open flow" means that flow is open to both fluid and objects through a passage.

Figure 2:
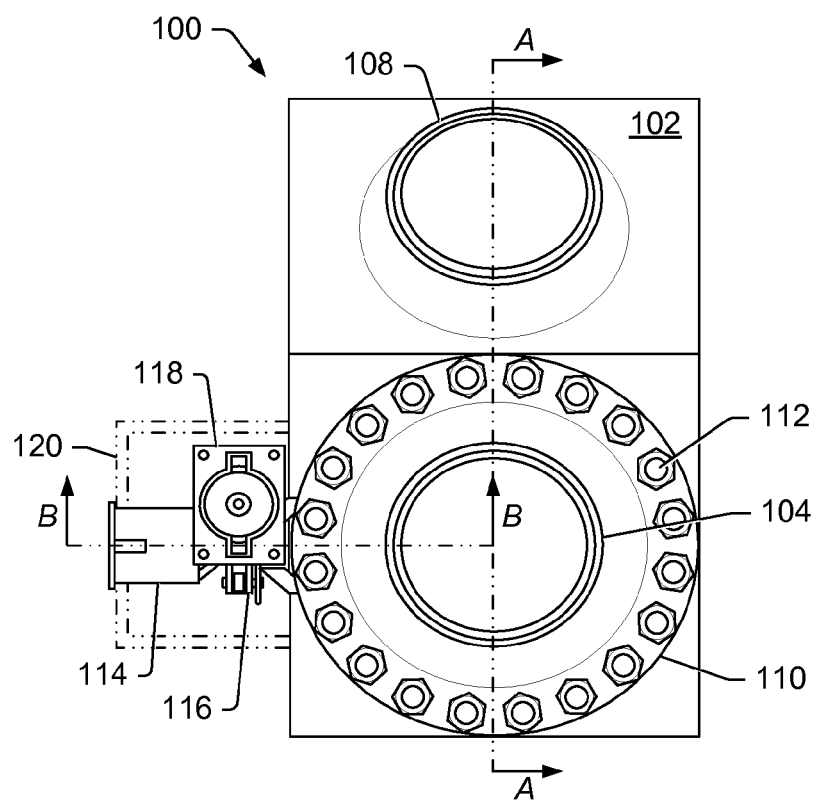
FIG. 2 depicts an end view of the subsea fitting depicted in FIG. 1.

FIG. 1 depicts a perspective representation of an embodiment of subsea fitting 100. FIG. 2 depicts an end view of fitting 100. Fitting 100 includes body 102. Body 102 may be made from materials such as, but not limited to, carbon steel, stainless steel, titanium, or aluminum. In some embodiments, body 102 is a single piece forged or cast from any of the above listed materials as well as other materials. In some embodiments, body 102 is constructed by welding fabrication of plates, tubes, and forged or cast parts. Fitting 100 and body 102 may be operable in high pressure conditions due to the pipeline's pressurized contained product or ambient pressure from deep subsea conditions. For example, fitting 100 and body 102 may be configured to meet selected ASME (American Society of Mechanical Engineers) standards, ANSI (American National Standards Institute) ratings, and/or ASTM (American Society for Testing and Materials) standards. In some embodiments, body 102 is coated with a material to increase the strength, weldability, and/or corrosion resistance of the body. For example, body 102 may be coated with an epoxy such as Carboline 890® epoxy (Carboline Company, St. Louis, Mo., USA).

In certain embodiments, fitting 100 is a wye-shaped fitting. Fitting 100 includes three ports 104, 106, and 108 on body 102. Ports 104, 106, and 108 may be at the ends of one or more passages in body 102 (e.g., the ports define the ends of the passages). Flanges may be coupled to one or more of the ports. In certain embodiments, flange 110 is coupled to port 104. Flange 110 may be coupled to port 104 using bolts 112, or other means such as welding or threaded engagement, that attach flange 110 to body 102 at port 104. In certain embodiments, ports 104, 106, and/or 108 allow fitting 100 to be coupled to one or more subsea pipelines and/or additional fittings. In some embodiments, ports 104, 106, and/or 108 are coupled to one or more subsea pipelines and/or additional fittings using methods known in the art (e.g., welding). For example, pipe or connector flanges may be welded to ports 104, 106, and/or 108 on fitting 100. In some embodiments, flange 110 and/or other flanges allow fitting 100 to be coupled to one or more subsea pipelines and/or additional fittings at ports 104, 106, and/or 108.

In certain embodiments, bucket 114 is coupled to flange 110. Bucket 114 may be coupled to flange 110 using connector 116. In some embodiments, connector 116 is coupled to bucket 118. In some embodiments, as shown in FIG. 2, covering 120 may enclose at least a portion of bucket 114, connector 116, and/or bucket 118. Covering 120 may at least partially protect bucket 114, connector 116, and/or bucket 118. For example, covering 120 may protect bucket 114, connector 116, and/or bucket 118 from being accidentally hit by objects in and around fitting 100 (e.g., a robotic arm or other subsea tool).

Figure 3:
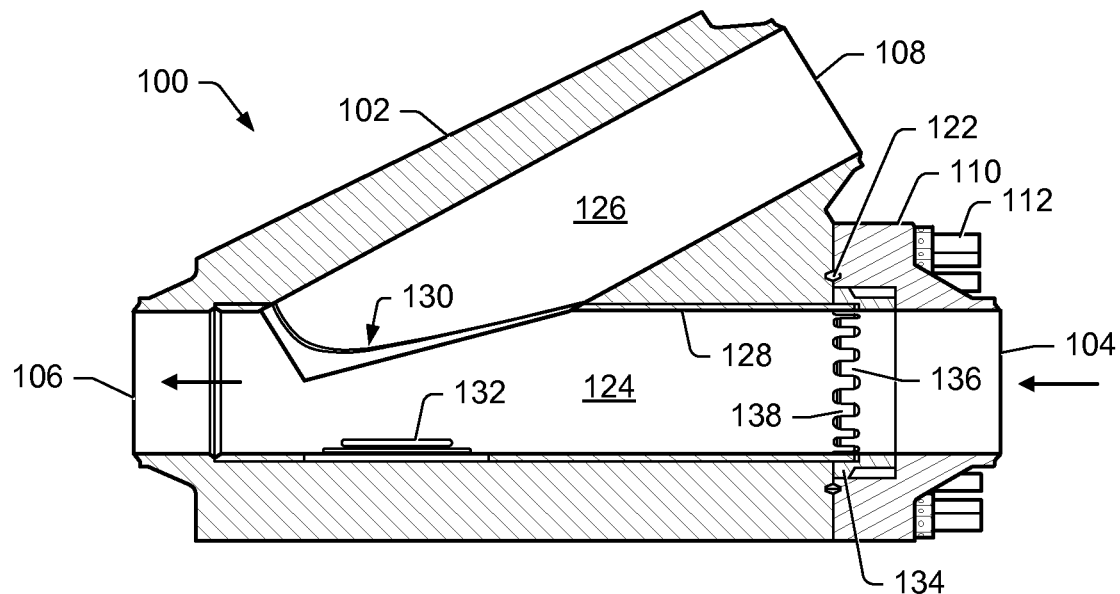
FIG. 3 depicts a cross-sectional representation of the fitting depicted in FIGS. 1 and 2 with a diverter in the fitting in an "open" position.
Figure 4:
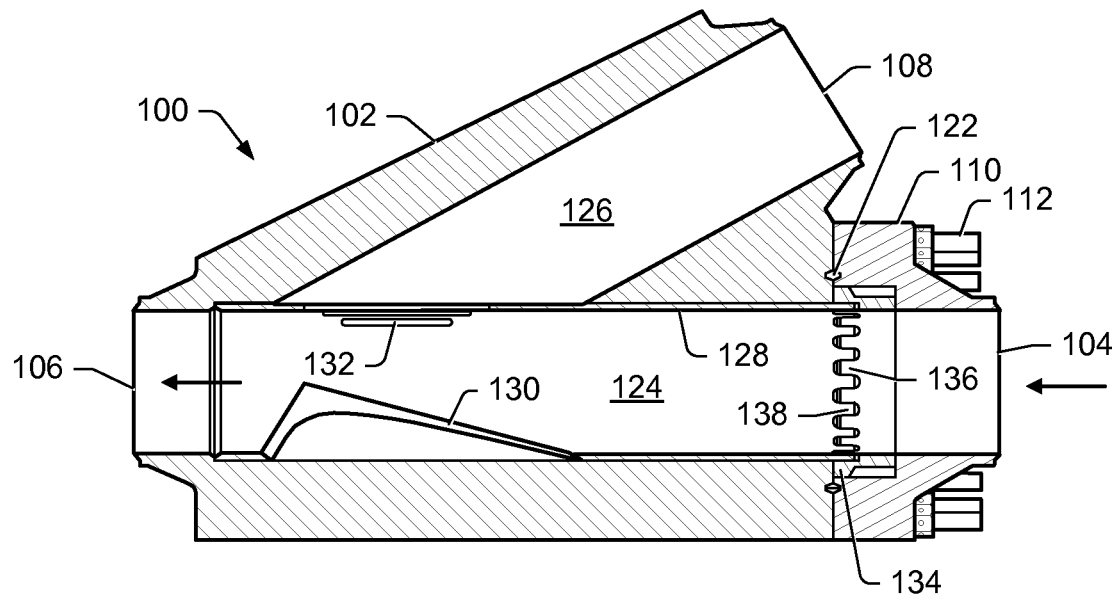
FIG. 4 depicts a cross-sectional representation of the fitting depicted in FIGS. 1 and 2 with the diverter in the fitting in a "closed" position.

FIGS. 3 and 4 depict cross-sectional representations of fitting 100 substantially along line A-A shown in FIG. 2. Passages 124 and 126 are in fluid communication with each other inside body 102. Passages 124 and 126 may be conduits through all or portions of body 102. In certain embodiments, passage 124 is a straight-through passage between port 104 and port 106. Passage 126 may branch off passage 124 to port 108 so that the passages are in a wye-shaped configuration. Passage 126 may branch off passage 124 at an angle that allows a pig to pass between the passages. In certain embodiments, passage 126 branches off passage 124 at an angle of about 30°. In some embodiments, passage 126 branches off passage 124 at an angle between about 0° and about 90°. In some embodiments, passage 126 branches off passage 124 at an angle in a range from about 10° to about 90°, in a range from about 20° to about 70°, or in a range from about 25° to about 60°.

Figure 9:
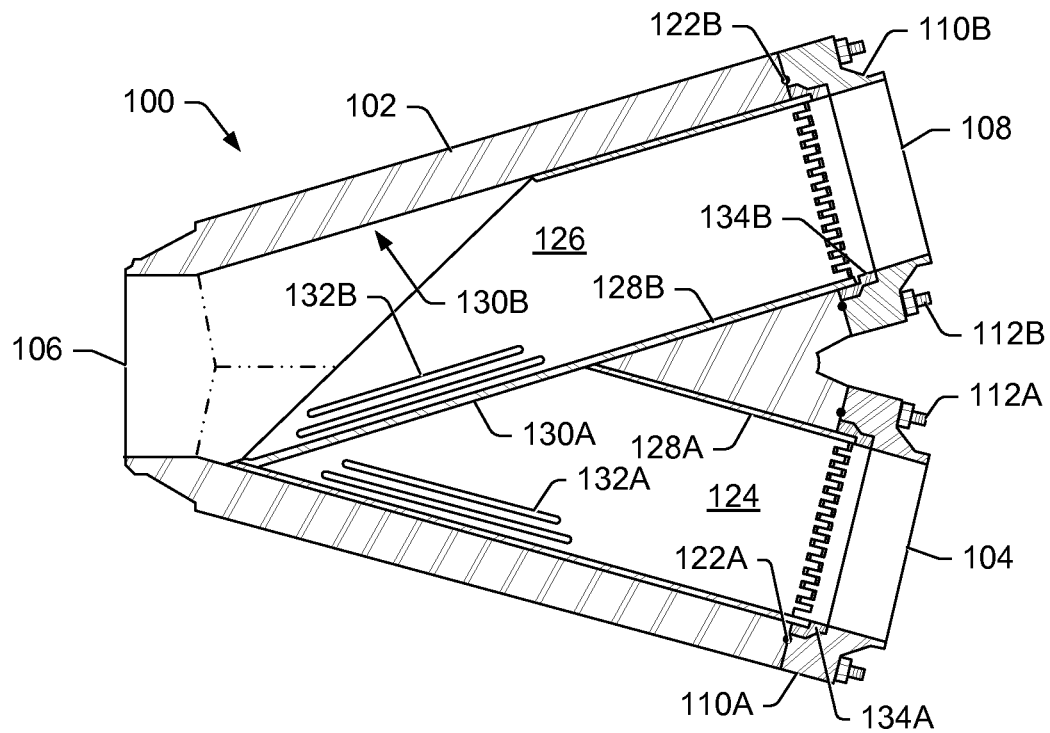
FIG. 9 depicts a cross-sectional representation of an embodiment of a subsea fitting with two diverters with one diverter in the closed position.

In some embodiments, passage 124 and/or passage 126 include one or more bends or other non-conformities as they pass through body 102. In some embodiments, passage 124 and passage 126 are symmetrical about a central axis (e.g., in a "Y"-shape about the central axis, as shown in FIG. 9). In certain embodiments, fitting 100 is designed so that fluid (e.g., oil) flow is through passage 124 from port 104 towards port 106 (in a right to left direction in FIGS. 3 and 4). Thus, a pig may enter fitting 100 through passage 126 via port 108 and be used to pig the pipeline in a reverse direction (e.g., a direction reverse to a combining flow direction in the pipeline). Pigging in the direction reverse of normal combining flow allows the pig to be launched into and retrieved from the pipeline at locations more convenient for the pipeline operator. Passage 126 and passage 124 are designed and oriented so that any standard pig (e.g., a cup or disc type pig) is usable with fitting 100.

As described above, flange 110 may be coupled to body 102 using bolts 112. In some embodiments, bolts 112 are threaded bolts attached to body 102 (e.g., the bolts are welded to the body, formed as part of the body, or threaded into threaded openings in the body). Nuts or other fasteners may be used to secure flange 110 to body 102 using bolts 112. In certain embodiments, seal 122 is provided between flange 110 and body 102. Seal 122 may be, for example, a gasket or o-ring that when pressed between the face of body 102 and the face of flange 110 creates a seal between the faces. Seal 122 inhibits fluid (e.g., seawater) from entering passage 124 between the faces of body 102 and flange 110 and inhibits fluid (e.g., pipeline fluid) from leaking out of passage 124 into the surrounding environment. In some embodiments, flange 110 is coupled to body 102 by welding the flange to the body. Welding the flange to the body allows the flange to be attached to the body without bolts and without a seal.

In certain embodiments, flange 110 includes and/or is coupled to diverter 128. Diverter 128 is a conduit (e.g., a sleeve or tubular) located inside passage 124 and/or passage 126. In certain embodiments, as shown in FIGS. 3 and 4, diverter 128 is within passage 124 and has a clearance between the diverter's outside face and the passage's inside face that allows the diverter to move (e.g., rotate) inside the passage (e.g., the diverter is a tubular that fits snugly inside the passage but is allowed to rotate inside the passage).

In certain embodiments, diverter 128 includes opening 130. Opening 130 is an opening sized to allow fluid and/or objects (e.g., pigs) to pass through diverter 128 between passage 124 and passage 126. In certain embodiments, opening 130 is an elliptical or scarf-shaped cut in diverter 128. The cut may substantially match the shape of the junction of passage 124 with passage 126 when opening 130 is aligned with the junction. In some embodiments, opening 130 has other shapes and/or sizes that match the size and/or shape of a junction between passages in fitting 100.

Diverter 128 may move (e.g., rotate) to move opening 130 in or out of position to allow fluid and/or objects to pass between passage 124 and passage 126. FIG. 3 depicts diverter 128 in an "open" position. In the open position, opening 130 is in a position that allows fluids and/or objects to pass between passage 124 and passage 126 (e.g., the passages are in fluid communication or there is "open flow" between the passages). FIG. 4 depicts diverter 128 in a "closed" position. In the closed position, opening 130 is in a position that inhibits fluids and/or objects from passing between passage 124 and passage 126.

In certain embodiments, diverter 128 includes one or more orifices 132. Orifices 132 may be small openings such as, but not limited to, slots, slits, holes, or other perforations. Orifices 132 may be located on an opposite side of diverter 128 from opening 130 (e.g., diametrically opposed to opening 130). In some embodiments, diverter 128 includes orifices 132 substantially over its entire surface to allow for fluid passage at all orientations of diverter 128. Orifices 132 are located on diverter 128 so that when the diverter is in the closed position, the orifices are positioned to allow at least some fluid to flow between passage 124 and passage 126. Allowing at least some fluid flow between the passages in the closed position may inhibit pressure differential buildup between the passages (e.g., substantially equalize the pressure between the passages). Allowing the flow between passages inhibits lateral thrust loads on diverter 128 that may be caused by differential pressures between the passages. Thrust loads may apply force to diverter 128 in its associated passage, which hinders rotation of the diverter. In certain embodiments, orifices 132 are distributed on diverter 128 so that thrust loads are minimized as the diverter begins to rotate. Orifices 132 may be sized to inhibit certain objects (e.g., pigs) to pass through the orifices and between passage 124 and passage 126 while allowing fluid to flow between the passages Diverter 128 may be moved (e.g., rotated) using a drive mechanism. The drive mechanism may include drive hub 134. Drive hub 134 may be located inside body 102 and coupled to, and/or contained by, flange 110. In certain embodiments, drive hub 134 includes teeth 136 that engage with teeth 138 on diverter 128. Teeth 136 may be formed as part of drive hub 134 or attached to drive hub 134 as a separate component (e.g., a ring gear that is attached to the drive hub by, for example, bolting, welding, or other attachment means). In some embodiments, teeth 136 and/or teeth 138 are castellations. When drive hub 134 is operated, teeth 136 engage with teeth 138 to move (e.g., rotate) diverter 128 between the open and closed positions. In certain embodiments, diverter 128 continuously rotates in one direction (e.g., either a clockwise or counterclockwise direction) to move between the open and closed positions. For example, diverter 128 may rotate 180° clockwise to move from the open to the closed position. Rotating diverter 128 another 180° clockwise moves the diverter from the closed position back to the open position. In some embodiments, diverter 128 is rotated in either direction to move between the open and closed positions (e.g., the diverter is rotated clockwise to open the diverter and counterclockwise to close the diverter). In certain embodiments, one or more physical "hard" stops or limits are included in fitting 100. The stops may be included to ensure that diverter 128 resides in a preferred position when it reaches the stops. For example, fitting 100 may include stops at the fully-open position and at the fully-closed position.

Figure 5:
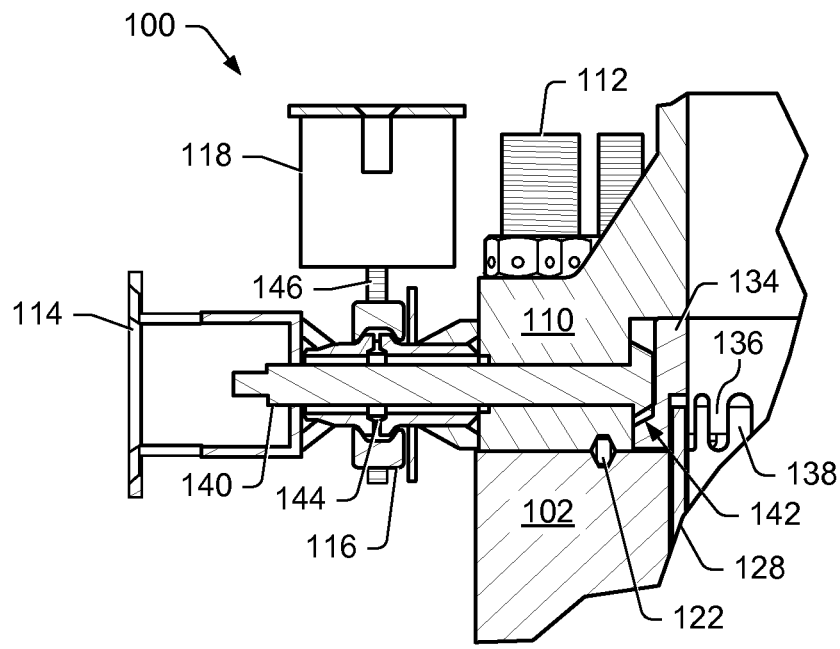
FIG. 5 depicts a cross-sectional representation of a portion of the fitting depicted in FIGS. 1 and 2 with the bucket installed.
Figure 6:
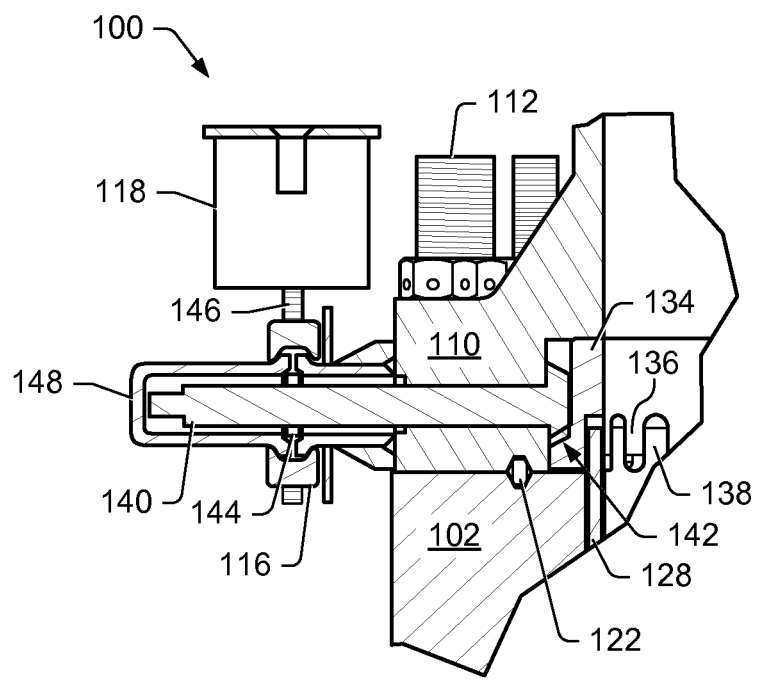
FIG. 6 depicts a cross-sectional representation of a portion of the fitting depicted in FIGS. 1 and 2 with the bucket removed and a blind hub installed on the operating mechanism.

In certain embodiments, drive hub 134 is coupled to a drive operator or gear that controls the operation (e.g., the rotation and orientation) of diverter 128. FIGS. 5 and 6 depict cross-sectional representations of fitting 100 substantially along line B-B shown in FIG. 2. FIG. 5 depicts gear 140 coupled to drive hub 134. In certain embodiments, gear 140 is a pinion gear. In certain embodiments, gear 140 includes a gear and a shaft coupled to the gear.

Figure 7:
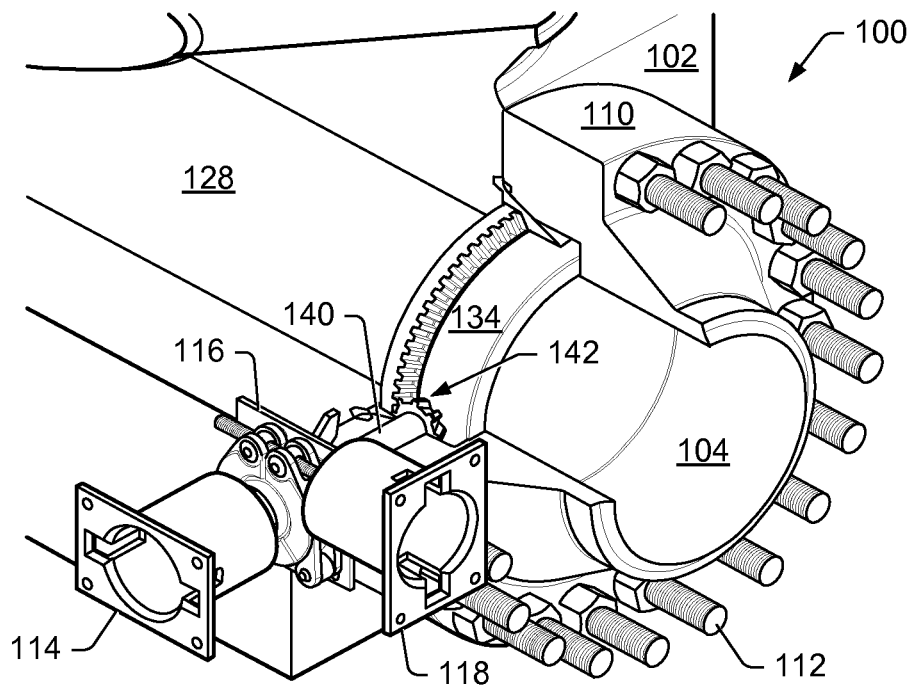
FIG. 7 depicts a perspective view of the subsea fitting with a portion of the fitting sectioned to show the teeth on a gear engaging the teeth on a drive hub.

Teeth on gear 140 may engage with teeth on drive hub 134 at point 142. In some embodiments, teeth on gear 140 and/or teeth on drive hub 134 are castellations. FIG. 7 depicts a perspective view of fitting 100 with a portion of the fitting sectioned to show the teeth on gear 140 engaging the teeth on drive hub 134. In certain embodiments, the teeth of drive hub 134 are an integral element of the drive hub. In some embodiments, the teeth of drive hub 134 are a separate component, such as a ring gear, which may be attached to the drive mechanism by, for example, bolting, welding, or other attachment means. In certain embodiments, the teeth on gear 140 and the teeth on drive hub 134 are beveled. The beveled teeth may efficiently couple operation of gear 140 to operation of drive hub 134, but other gear tooth profiles such as spiral and worm gears may be used. Gear 140 may be operated (e.g., rotated) to operate (e.g., rotate) drive hub 134. As described above, operation of drive hub 134 moves (e.g., rotates) diverter 128.

In certain embodiments, gear 140 is able to operate under pressure conditions (e.g., under subsea pressure conditions or pressurized fluid conditions in the fitting). For example, gear 140 may pass through one or more seals (e.g., seal 144 shown in FIGS. 5 and 6). As shown in FIGS. 5 and 6, seal 144 may be located inside connector 116. Seal 144 may be, for example, a dynamic and/or bidirectional seal such as a lip seal, o-ring, or other pressure-energized or enhanced seal. Seal 144 allows gear 140 to operate under subsea and/or pipeline pressure conditions by pressure isolating the internal operation of the gear (e.g., the coupling between the gear and drive hub 134) from the ambient environment. In certain embodiments, seal 144 allows gear 140 to operate at water depths of about 10,000 feet or more.

Figure 8:
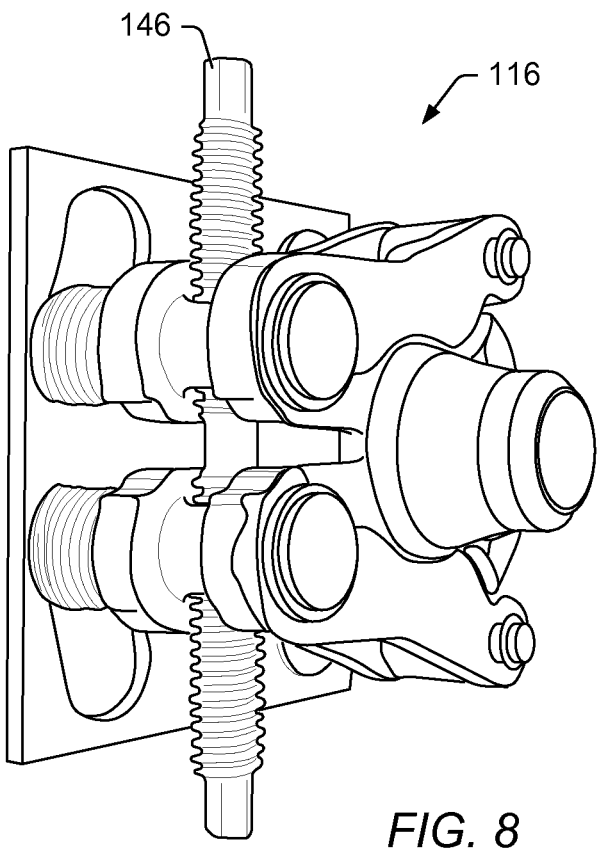
FIG. 8 depicts a perspective view of an embodiment of a connector.

FIG. 8 depicts a perspective view of an embodiment of connector 116. It is to be understood that the connector embodiment depicted in FIG. 8 is merely an example of one embodiment of a connector that may be used in fitting 100 and that there are alternative embodiments of connectors known in the art that may be used to serve the same function and/or purpose. In certain embodiments, connector 116 is a clamp type connector. The base of connector 116 may be attached (e.g., brazed or welded) to flange 110, as shown in FIGS. 5 and 6. Operation of the clamp portion of connector 116 may be controlled using connector screw 146, shown in FIGS. 5, 6, and 8. Connector screw 146 may be operated (e.g., rotated clockwise or counterclockwise) to either open or close the clamp of connector 116. In certain embodiments, connector screw 146 is operated to close the clamp and close seal 144 around the shaft of gear 140, as shown in FIGS. 5 and 6. In certain embodiments, connector screw 146 and/or gear 140 are operable using a remotely operated vehicle (an ROV).

In certain embodiments, bucket 118 is coupled to connector screw 146. Bucket 118 may be, for example, a torque bucket or other device that allows connector screw 146 to be more easily operated (e.g., the bucket allows more torque to be applied to the connector screw to rotate the screw). Bucket 118 may also act as a guide or "dock" for a robot arm (e.g., an arm of an ROV) to engage connector screw 146. For example, bucket 118 may be an industry standard torque bucket designed per API (American Petroleum Institute) 17D specifications.

In certain embodiments, bucket 114 is coupled to connector 116, as shown in FIGS. 5 and 7. Bucket 114 may be, for example, a torque bucket or other device that allows gear 140 to be operated (e.g., the bucket allows more torque to be applied to the gear to rotate the gear). Bucket 114 may also act as a guide or dock for a robot arm (e.g., an arm of an ROV) to engage gear 140. For example, bucket 114 may be an industry standard torque bucket designed per API (American Petroleum Institute) 17D specifications.

In some embodiments, connector 116 and/or connector screw 146 are operated using other types of operators. In some embodiments, the connector and/or the connector screw are operated using operators such as, but not limited to, a handle, a wheel, or a wrench-operated device. Such operators as the handle, wheel, or wrench-operated device may be operable in shallow water applications of fitting 100 where manual operation of the fitting is possible.

In some embodiments, bucket 114 is removed (e.g., uncoupled) from connector 116. For example, bucket 114 may be removed from connector 116 and replaced with blind hub 148, as shown in FIG. 6. Blind hub 148 may be coupled to connector 116 to cover the outer engagement portion of gear 140. In certain embodiments, blind hub 148 is used to provide a metal-sealed closure over gear 140 to inhibit leaks in the gear system. Providing a metal-sealed closure over gear 140 increases long-term reliability of fitting 100 against leaks by providing a metal backup seal against leaks due to deterioration of any internal seal leaks such as elastomeric or polymeric seals. In some embodiments, blind hub 148 is used to inhibit activation of gear 140 and/or inhibit damage to the gear. For example, blind hub 148 may be used to protect gear 140 from being accidentally hit and damaged.

In certain embodiments, fitting 100 includes two diverters. For example, one diverter may be located in each of the passages inside fitting 100. FIG. 9 depicts a cross-sectional representation of an embodiment of fitting 100 with two diverters 128A and 128B. In the embodiment depicted in FIG. 9, fitting 100 is a symmetrical fitting (e.g., passages 124 and 126 are symmetrical about a central axis). However, two diverters may be used in fittings that are not symmetrical (e.g., fitting 100 depicted in FIGS. 1-4).

In the embodiment depicted in FIG. 9, diverter 128A is located in passage 124 and diverter 128B is located in passage 126. Each of the diverters has its own associated flange and operating mechanisms. For example, diverter 128A is coupled to flange 110A and drive hub 134A while diverter 128B is coupled to flange 110B and drive hub 134B. Flange 110A may be coupled to body 102 using bolts 112A and seal 122A. Flange 110B may be coupled to body 102 using bolts 112B and seal 122B.

Diverters 128A and 128B include openings 130A and 130B, respectively. Openings 130A and 130B may be shaped to substantially match the shape of the junction between passages 124 and 126 when diverters 128A and 128B are in the open positions. Diverters 128A and 128B may also include orifices 132A and 132B, respectively. FIG. 9 depicts an embodiment of fitting 100 with diverter 128A in the open position (opening 130A is open to passage 126) and diverter 128B in the closed position (opening 130B is closed off to passage 124). In such an embodiment, passage 126 is open to flow and may be cleaned (e.g., passage 126 is open for pigging). In an alternative embodiment, diverter 128A is in the closed position and diverter 128B is in the open position so that passage 124 is open to flow and may be pigged in the reverse flow direction.

Figure 10:
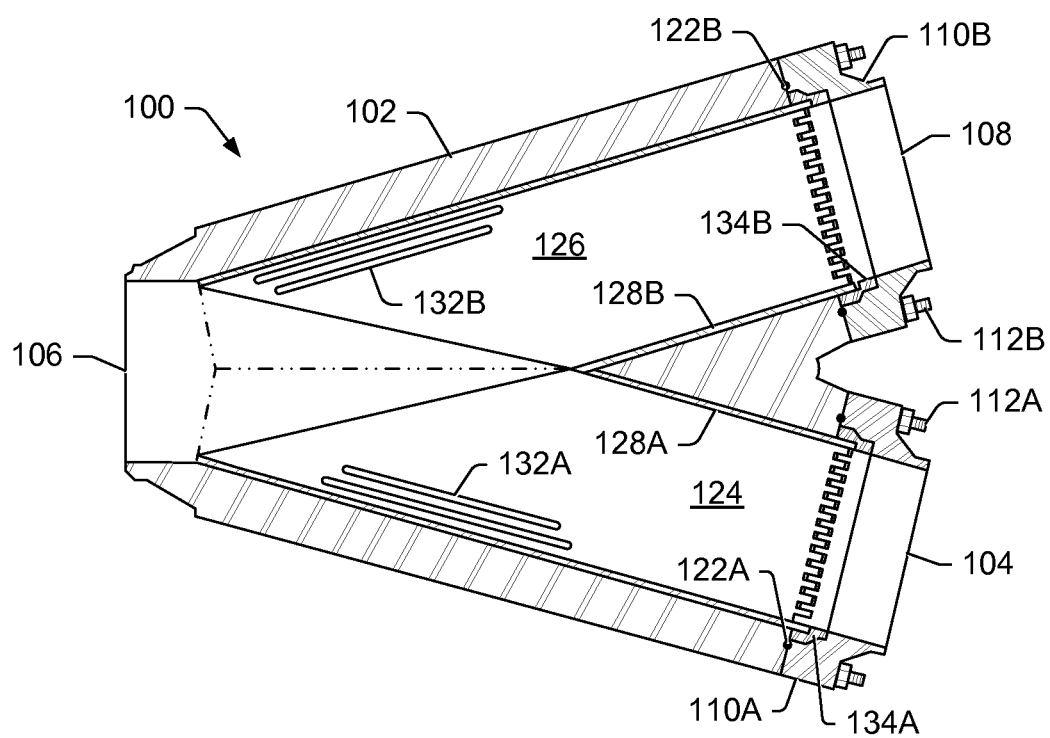
FIG. 10 depicts a cross-sectional representation of an embodiment of a subsea fitting with two diverters with both diverters in the open position.

FIG. 10 depicts a cross-sectional representation of an embodiment of fitting 100 with two diverters 128A and 128B with both diverters in the open position. In such an embodiment, passages 124 and 126 are both open for flow simultaneously. In addition, one or both of the passages may be pigged in the combining flow direction when both diverters are in the open position. In some embodiments, one of diverters 128A and 128B may be closed to direct objects larger than the diverter orifices through the fitting in a specific passage.

Figures 11, 12:
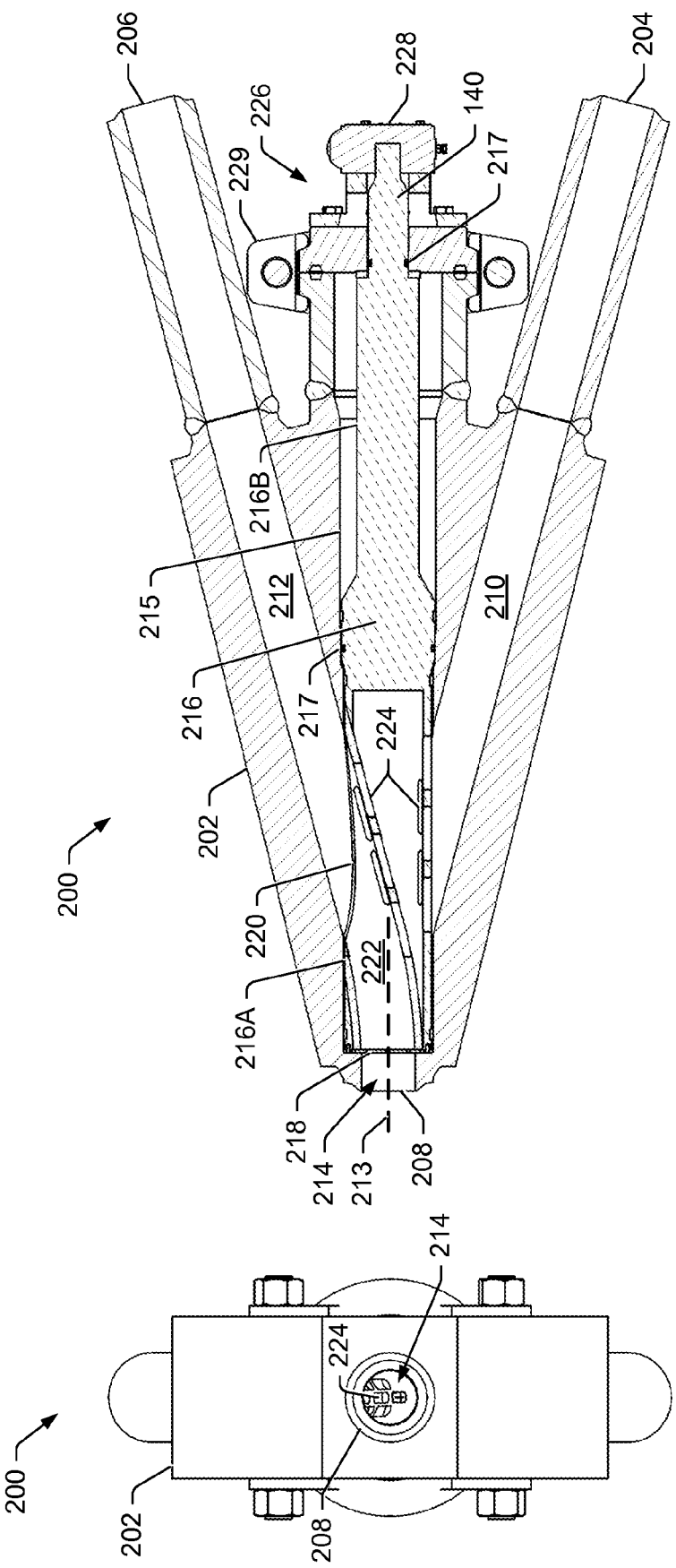
FIG. 11 depicts a cross-sectional representation of another embodiment of a subsea fitting.
FIG. 12 depicts an end view of the embodiment depicted in FIG. 11.
Figures 13, 14:
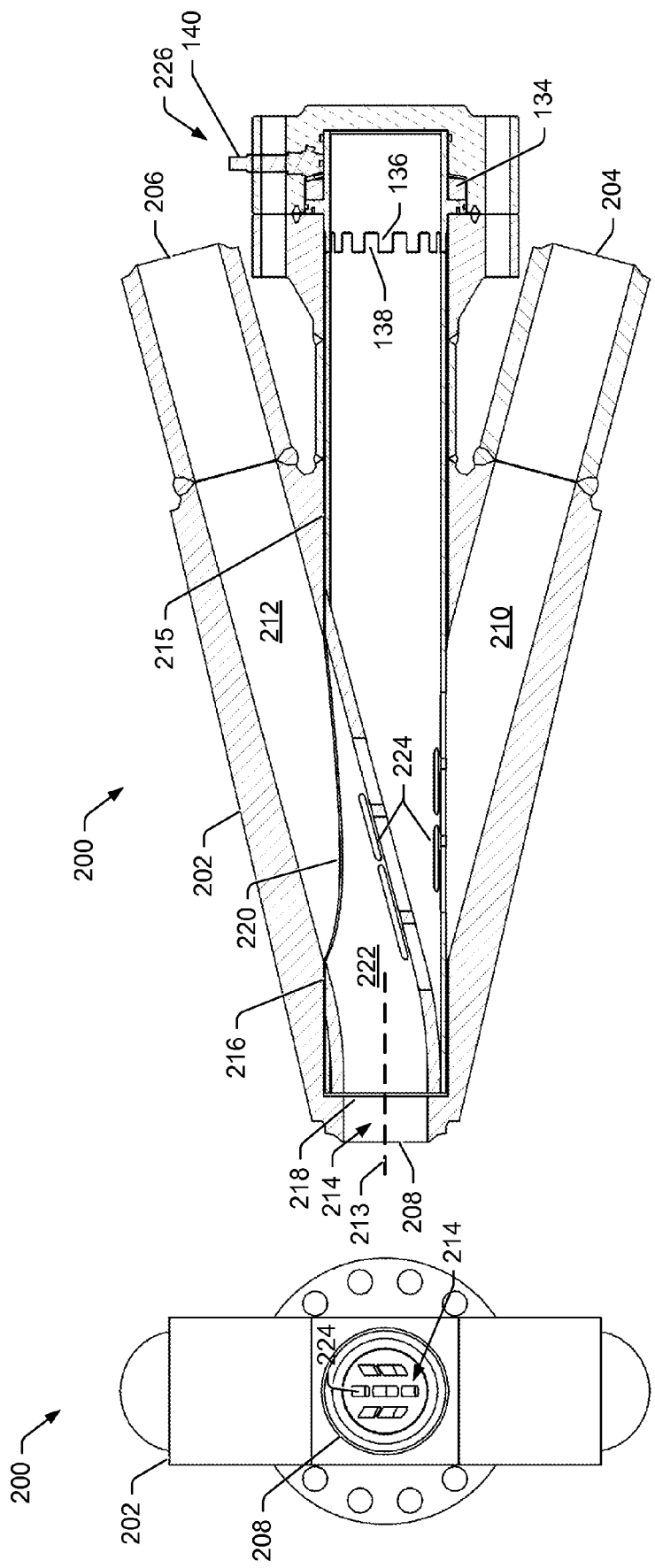
FIG. 13 depicts a cross-sectional representation of yet another embodiment a subsea fitting.
FIG. 14 depicts an end view of the embodiment depicted in FIG. 13.
Figure 19:
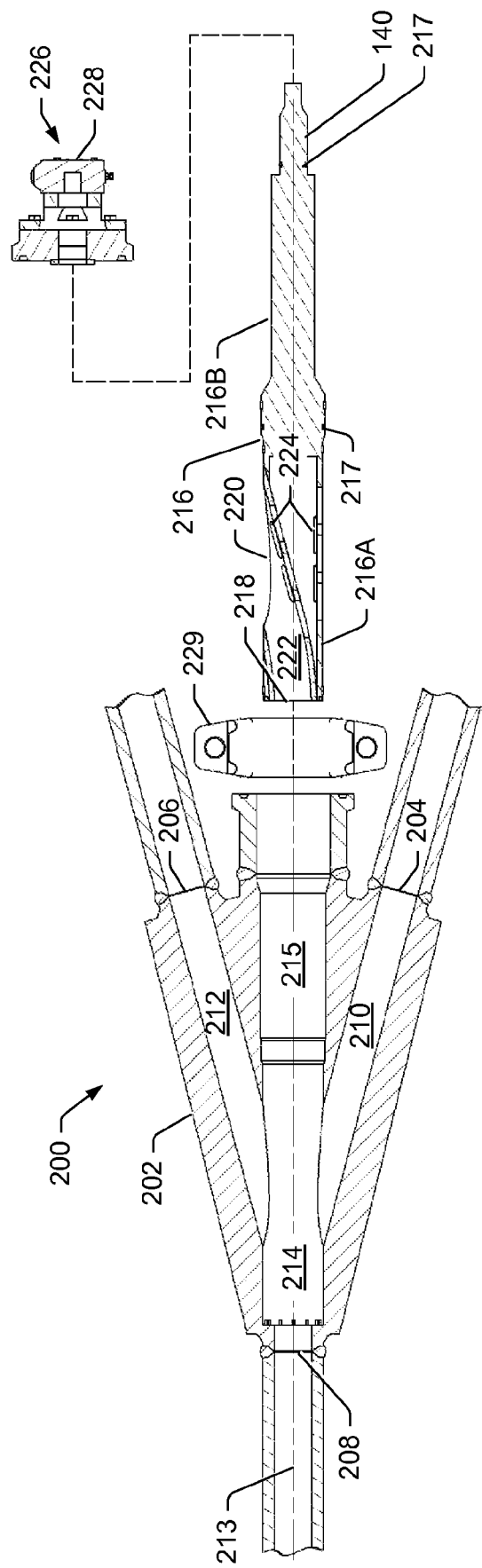
FIG. 19 depicts an exploded cross-sectional representation of the subsea fitting depicted in FIG. 11.
Figure 20:
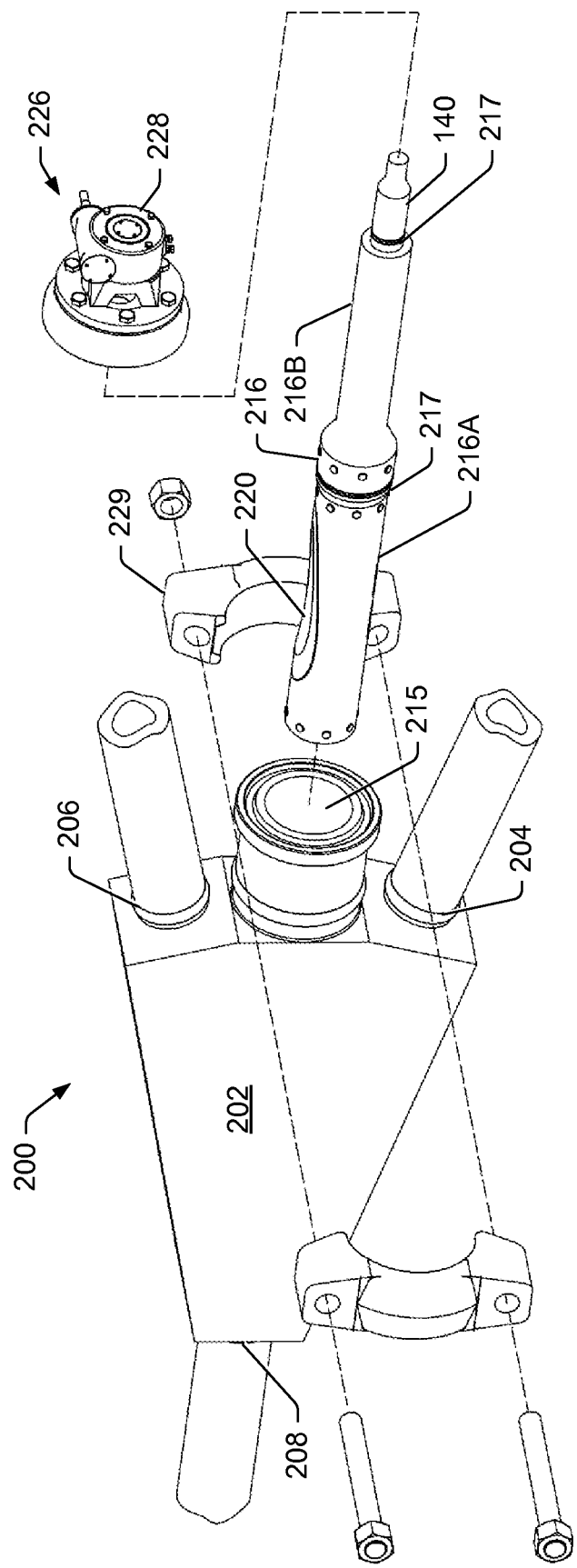
FIG. 20 depicts an exploded perspective view of the subsea fitting depicted in FIG. 11.

FIGS. 11, 13, and 15 depict embodiments of subsea fitting 200 that may be used in a pipeline. FIG. 12 depicts an end view of the embodiment depicted in FIG. 11. FIG. 19 depicts an exploded cross-sectional representation of the subsea fitting depicted in FIG. 11. FIG. 20 depicts an exploded perspective view of the subsea fitting depicted in FIG. 11 with the diverter removed from the body. FIG. 14 depicts an end view of the embodiment depicted in FIG. 13. FIG. 16 depicts an end view of the embodiment depicted in FIG. 15. It is to be understood that while fluid flow herein is described for the typical normal fluid flow situation (fluid flows from right to left in FIGS. 11, 13, and 15), it is also possible for fluid to flow in the opposite direction within fitting 200 as needed. Thus, when fluid and/or objects are described to flow from one passage to another passage, it also possible for fluid and/or objects to flow in the opposite direction.

It is to be further understood that while fitting 200 depicted in FIGS. 11-16 is typically used in a subsea environment, the fitting may be used in other environments. For example, fitting 200 may be used in shallow water operations (such as for pipeline transitions) and/or in land-based operations. In addition, fitting 200 may include additional features that enable the fitting to be used in deep water applications (such as attachments for ROV handling).

As shown in FIGS. 11-16, fitting 200 includes body 202. Body 202 may be made from materials such as, but not limited to, carbon steel, stainless steel, titanium, or aluminum. In some embodiments, body 202 is a single piece forged or cast from any of the above listed materials as well as other materials. In some embodiments, body 202 is constructed by welding fabrication of plates, tubes, and forged or cast parts. Fitting 200 and body 202 may be operable in high pressure conditions due to the pipeline's pressurized contained product or ambient pressure from deep subsea conditions. For example, fitting 200 and body 202 may be configured to meet selected ASME (American Society of Mechanical Engineers) standards, ANSI (American National Standards Institute) ratings, and/or ASTM (American Society for Testing and Materials) standards. In some embodiments, body 202 is coated with a material to increase the strength, weldability, and/or corrosion resistance of the body. For example, body 202 may be coated with an epoxy such as Carboline 890® epoxy (Carboline Company, St. Louis, Mo., USA).

In certain embodiments, fitting 200 is a wye-shaped fitting. In certain embodiments, as shown in FIGS. 11, 13, 15, and 19, fitting 200 includes three ports 204, 206, and 208 on body 202. Ports 204, 206, and 208 may be openings at the ends of one or more passages 210, 212, 214 in body 202 (e.g., the ports or openings are at the ends of the passages). In certain embodiments, ports 204, 206, and/or 208 allow fitting 200 to be coupled to one or more subsea pipelines and/or additional fittings. In some embodiments, ports 204, 206, and/or 208 are coupled to one or more subsea pipelines and/or additional fittings using methods known in the art (e.g., welding). For example, pipe or connector flanges may be welded to ports 204, 206, and/or 208 on fitting 200.

In certain embodiments, passages 210, 212, and 214 are in fluid communication with each other inside body 202. Passages 210, 212, and 214 may be conduits or openings through all or portions of body 202. Passage 210 and passage 212 may branch off passage 214 such that the passages are in a wye-shaped configuration. In some embodiments, passage 210 and passage 212 are symmetrical (e.g., in a "Y"-shape) about a central axis 213 of fitting 200 (the central axis being, for example, a line passing through the midpoint of passage 214).

Passage 214 may be a common passage for passage 210 and passage 212. For example, fluids may flow from passage 210 and passage 212 and converge into passage 214 or fluids may flow from passage 214 and diverge into passage 210 and passage 212. In certain embodiments, fitting 200 is designed such that fluid (e.g., oil) flow is through from passages 210 and 212 into passage 214 (e.g., fluid enters the fitting through ports 204, 206 and exits through port 208). A pig may enter fitting 200 through passage 214 via port 208 and be used to pig the pipeline in a reverse direction (e.g., a direction reverse to a combining flow direction in the pipeline). Pigging in the direction reverse of normal combining flow allows the pig to be launched into and retrieved from the pipeline at locations more convenient for the pipeline operator. Passages 210, 212, and 214 are designed and oriented such that any standard pig (e.g., a cup or disc type pig) is usable with fitting 200.

Passages 210, 212 may branch off passage 214 at an angle that allows a pig to pass from passage 214 to either passage 210 or passage 212. In certain embodiments, passages 210, 212 branch off passage 214 at angles of about 30° (e.g., about 30° relative to central axis 213). In some embodiments, passages 210, 212 branch off passage 214 at angles between about 0° and about 90°. In some embodiments, passages 210, 212 branch off passage 214 at angles in a range from about 10° to about 90°, in a range from about 20° to about 70°, or in a range from about 25° to about 60°.

In certain embodiments, body 202 includes bore 215. Bore 215 may be a conduit or opening through all or a portion of body 202. Bore 215 may be located in body 202 between passages 210, 212. Bore 215 may couple to and be in fluid communication with passage 214. In certain embodiments, bore 215 is concentric with passage 214 and port 208. For example, a central axis of bore 215 may be aligned along central axis 213. In some embodiments, passage 214 and bore 215 are a single concentric conduit through body 202 (for example, the center of the body). In certain embodiments, bore 215 bisects passages 210, 212 (e.g., the bore is positioned symmetrically between passages 210, 212 or at the center of the "Y" formed by the passages). In some embodiments, as shown in FIG. 15, bore 215 is enclosed inside body 202 (e.g., the end of the bore opposite passage 214 does not have an opening out of the body).

In certain embodiments, fitting 200 includes diverter 216 located inside body 202. Diverter 216 may be a conduit, a cylinder, a sleeve, a tubular, a shaft, or a combination thereof. In certain embodiments, as shown in FIGS. 11, 19, and 20, diverter 216 includes tubular portion 216A and shaft portion 216B. In some embodiments, as shown in FIGS. 13 and 15, diverter 216 is a tubular.

In certain embodiments, diverter 216 is located in passage 214 and bore 215 inside body 202, as shown in FIGS. 11, 13, and 15. Diverter 216 may be positioned in passage 214 and bore 215 along the center axis of body 202. One end of diverter 216 (for example, tubular portion 216A) may be located in passage 214 between passages 210, 212, as shown in FIGS. 11, 13, and 15.

In certain embodiments, an end portion of diverter 216 (e.g., tubular portion 216A) tightly fits in the wall of body 202 near passage 214 to inhibit fluid and/or debris from flowing between the outside of the diverter and the walls of the body into passage 210 or passage 212. In addition, the lateral end of diverter 216 may press up against (e.g., abut) a portion of the wall of body 202 near passage 214. The wall of body 202 near passage 214 may have a complementary shape (as shown in FIG. 19) that acts as a "stop" for diverter 216 when the diverter is inserted into the body.

In certain embodiments, a portion of diverter 216 tightly fits within walls of bore 215 between passages 210, 212 to inhibit fluid and/or debris from flowing between the outside of the diverter and the wall of the bore. In some embodiments, as shown in FIG. 11, the portion of diverter 216 that tightly fits within wall of bore 215 is shaft portion 216B of the diverter. Other portions of diverter 216, however, may tightly fit in wall of bore 215. For example, tubular portions of diverter 216 may tightly fit in wall of bore 215, as shown in FIGS. 13 and 15.

In certain embodiments, as shown in FIG. 11, one or more seals 217 are used to provide a barrier to fluid and/or debris flow between the outside of diverter 216 and the wall of bore 215. Seals 217 may be located at the part of the diverter that tightly fits inside bore 215. Seals 217 may be, for example, circumferential seals such as o-rings or gaskets. For example, seals 217 may be rotating circumferential o-ring seals. In some embodiments, seals 217 are placed in grooves on diverter 216, as shown in FIGS. 19 and 20. The tight fit of the portion of diverter 216 inside bore 215 and the use of seals 217 may block fluid flow in the annular region between the portion of diverter 216 inside bore 215 and the walls of bore 215 to inhibit debris accumulation in the bore (e.g., in the bore around shaft portion 216B). Debris accumulation inside bore 215 may impede rotation of diverter 216. Thus, inhibiting debris accumulation inside bore 215 increases the robustness and/or operational lifetime of fitting 200.

In certain embodiments, the tight fit of the portion of diverter 216 inside bore 215 and/or seals 217 is located as close as possible to the intersection of the bore and passages 210, 212. Reducing the distance between the seal around diverter 216 and the intersection of bore 215 and passages 210, 212 reduces the space available for debris accumulation between the diverter and the wall of the bore.

In certain embodiments, diverter 216 has opening 218 at the end of the diverter located in passage 214 (e.g., the end of tubular portion 216A depicted in FIG. 11). Opening 218 allows fluid to flow between the inside of diverter 216 and passage 214. Thus, the inside of diverter 216, passage 214, and port 208 are in fluid communication with each other.

In certain embodiments, diverter 216 includes opening 220 in the wall (lateral side) of the diverter. In some embodiments, as shown in FIG. 11, opening 220 is in tubular portion 216A of diverter 216. Opening 220 is an opening sized to allow fluid and/or objects (e.g., pigs) to pass through diverter 216 to either passage 210 or passage 212. In the illustrated embodiment, opening 220 is directed upward to direct fluid and/or objects into passage 212. Other embodiments may include rotating diverter 216 and opening 220 approximately 180° about central axis 213 to direct fluid and/or objects into passage 210. In certain embodiments, opening 220 is an elliptical or scarf-shaped cut in wall of diverter 216. The cut may substantially match the size and shape of the portion of diverter 216 in either passage 210 or passage 212 when opening 220 is aligned in the corresponding passage.

In certain embodiments, opening 218 and opening 220 are joined by passage 222 inside diverter 216. Passage 222 may be a borehole or other passage formed inside diverter 216. Passage 222 is formed inside diverter 216 to allow fluid to flow between opening 218 and opening 220 via the passage. Thus, fluid is allowed to flow through the diverter between passages in the body. For example, with normal fluid flow, as shown in FIGS. 11, 13, and 15, fluid enters fitting 200 at port 206, flows through passage 212 and enters diverter 216 at opening 220, flows through passage 222, exits diverter 216 into passage 214 at opening 218, flows through passage 214 and out of the fitting at port 208.

Figure 17:
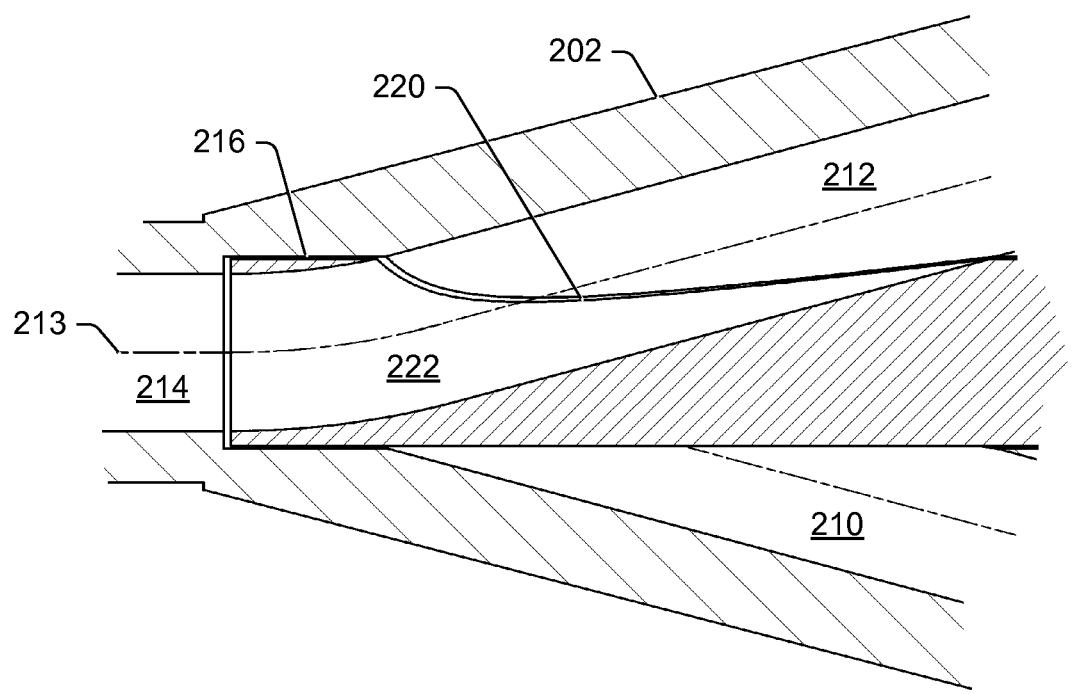
FIG. 17 depicts a representation of a curved passage.
Figure 18:
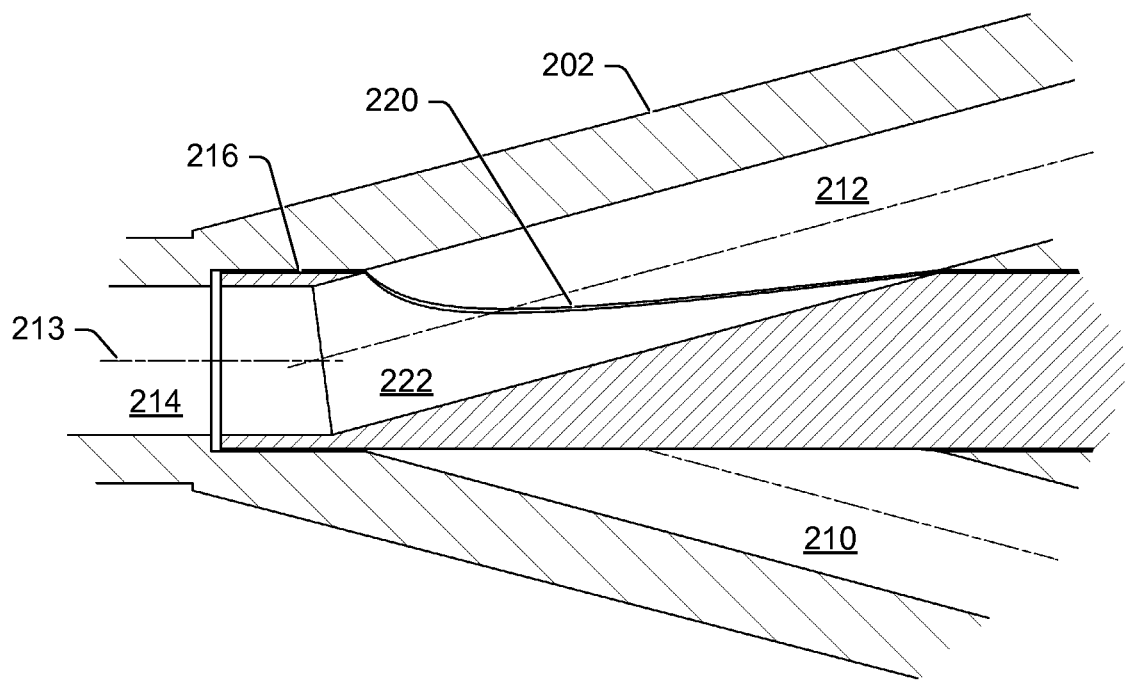
FIG. 18 depicts a representation of a mitered passage.

In certain embodiments, passage 222 has a selected shape that accommodates movement of a pig through the passage. For example, passage 222 is shaped such that a pig does not bind as it moves through diverter 216. In some embodiments, passage 222 has a curved shape. FIG. 17 depicts a representation of curved passage 222. In some embodiments, passage 222 has a mitered shape. FIG. 18 depicts a representation of mitered passage 222. In certain embodiments, the bend (elbow) of the curved or mitered section of passage 222 is sized to inhibit binding of the pig in the passage. For example, the radius of the bend of passage 222 may be at least 1.5 times, at least 3 times, or at least 5 times the diameter of the passage. The radius of the bend of passage 222 may, in certain embodiments, be selected based on the type of pig to be used in fitting 200.

In certain embodiments, diverter 216 moves (e.g., rotates) to move opening 220 into position in one of passages 210, 212. When opening 220 is located in a selected passage (either passage 210 or passage 212), passage 222 directs a pig entering diverter 216 from passage 214 through opening 220 into the selected passage. For example, as shown in FIGS. 11, 13, and 15, diverter 216 is rotated such that opening 220 is aligned with passage 212. In this position, the pig entering passage 214 (from the left in FIGS. 11, 13, and 15), enters passage 222 through opening 218 and is directed by the shape of passage 222 into passage 212 through opening 220. Diverter 216 may be rotated approximately 180° about central axis 213 such that opening 220 is aligned with passage 210. In this position, the pig entering passage 214 (from the left in FIGS. 11, 13, and 15), enters passage 222 through opening 218 and is directed by the shape of passage 222 into passage 210 through opening 220.

In some embodiments, diverter 216 includes one or more orifices 224. Orifices 224 may be small openings such as, but not limited to, slots, slits, holes, or other perforations. Orifices 224 may be located on an opposite side of diverter 216 from opening 220 (e.g., diametrically opposed to opening 220). In some embodiments, diverter 216 includes orifices 220 substantially over its entire surface to allow for fluid passage at all orientations of diverter 216. Orifices 224 may also be located on the wall of passage 222 inside diverter 216.

Orifices 224 are located in diverter 216 such that when the diverter is in position in the selected passage (e.g., passage 212), the orifices are positioned to allow at least some fluid to flow into the non-selected passage (e.g., passage 210). Orifices 224 allow sustained fluid flow from the non-selected passage while opening 220 allows sustained fluid flow from the selected passage. Allowing fluid flow between passage 214 and both the selected and non-selected passages may inhibit pressure differential buildup between the passages (e.g., substantially equalize the pressure between the passages) and/or allows continuous operation of combining flow while being able to selectively pig one of the passages. Allowing the flow from both passages may inhibit lateral thrust loads on diverter 216 that may be caused by differential pressures from the passages. Thrust loads may apply force to diverter 216 from its associated passage that may hinder rotation of the diverter. In certain embodiments, orifices 224 are distributed on diverter 216 such that thrust loads are minimized as the diverter begins to rotate.

In certain embodiments, orifices 224 are sized, shaped, and/or oriented to inhibit certain objects (e.g., pigs or features of pigs) to pass through the orifices and into the non-selected passage. For example, orifices 224 may be sized, shaped, and/or oriented to inhibit spring-loaded wheels used on pigs, used to detect pipeline anomalies, from getting stuck or hung up on the orifices. The size, shape, and/or orientation of orifices 224 may be selected based on, for example, the type of pig to be used in the fitting and the type of wheels used on the pig. For example, for certain types of pigs, orifices with diameters 1½" or smaller may be used to inhibit the wheels of the pig from getting stuck or hung up on the orifices. In some embodiments, orifices 224 are sized, shaped, and/or oriented to inhibit debris accumulation in the orifices. For example, the orifices may have a minimum diameter to allow debris to pass through the orifices and not get stuck in the orifices.

In some embodiments, diverter 216 does not include orifices 224 or orifices 224 are sized to inhibit substantial flow from the non-selected passage. In such embodiments, when opening 220 is located in a selected passage (either passage 210 or passage 212), opening 220 allows fluid and/or objects to pass from the selected passage into passage 214 while fluid and/or objects are inhibited from flowing from the non-selected passage into passage 214. Thus, as shown in FIGS. 11, 13, and 15, passage 212 is in fluid communication with passage 214 (e.g., passage 212 and passage 214 are in fluid communication or there is "open flow" between the passages) while fluid and/or objects are inhibited from flowing between passage 210 and passage 214 by the wall of diverter 216 being rotated into alignment with in passage 210 to block flow between passage 210 and passage 214.

In some embodiments, diverter 216 is rotated such that opening 220 is not aligned with either passage 210 or passage 212. In such embodiments, open flow is inhibited between passage 214 and either passage 210 or passage 212.

In some embodiments, fitting 200 includes more than two passages branching off passage 214 (e.g., the fitting has one or more passages in addition to passages 210 and 212). For example, fitting 200 may includes three, four, five, or more passages diverging from passage 214. Diverter 216 may be positioned in fitting 200 to allow the diverter to rotate between the passages and select one of the passages for open flow. In some embodiments, the multiple passages are symmetrical about central axis 213 of fitting 200 and diverter 216 is located along the central axis of the fitting. Opening 220 in diverter 216 may be sized and/or shaped to allow flow from only one passage of the multiple passages or, in the alternative, the diverter may include multiple openings to allow flow in more than one passage simultaneously.

In certain embodiments, as shown in FIGS. 11, 13, 15, 19, and 20, diverter 216 is coupled to drive mechanism 226. FIGS. 11, 13, 15, 19, and 20 depict three different embodiments of drive mechanisms 226 that may be used to move (rotate) diverter 216 in body 202. It is to be understood that the embodiments of drive mechanism 226 depicted in FIGS. 11, 13, and 15 are set forth as examples of drive mechanisms that may be used to move (rotate) diverter 216 but that any drive mechanism known in the art and suitable to move the diverter may be used.

In some embodiments, as shown in FIG. 11, drive mechanism 226 includes a conventional worm-drive gearbox. Gear 140 is coupled to shaft portion 216B of diverter 216 and the gear operates to rotate the diverter. Gear 140 may be formed as part of shaft portion 216B. Gear 140 is shaped to engage gear box 228. Gear box 228 is coupled to gear 140 and is used to operate (rotate) the gear. Thus, gear box 228 is used as the actuating mechanism for drive mechanism 226. In certain embodiments, gear 140 extends outside body 202 such that gear box 228 is located external of the body.

In certain embodiments, body 202 has a flange-type fitting at the end of bore 215. Drive mechanism 226 may include a flange-type fitting that interfaces with the flange-type fitting on body 202. A gasket or other sealing device may be used between the flange-type fittings to provide a seal between the fittings. Clamp 229 may secure the flange-type fittings together and secure the seal between the fittings. Thus, a sealed, flanged coupling is made between body 202 and drive mechanism 226.

In certain embodiments, shaft portion 216B of diverter 216 is coupled to body 202 at the sealed flange coupling between body 202 and drive mechanism 226. Gear 140 is coupled to gear box 228 and a portion of the gear may be sealed in drive mechanism 226 using seal 217. Thus, when drive mechanism 226 is secured to body 202 with clamp 229, shaft portion 216B and diverter 216 are secured in and coupled to body 202 with the sealed, flanged coupling.

In some embodiments, as shown in FIG. 13, drive mechanism 226 includes a drive mechanism similar to the drive mechanism depicted in FIGS. 3-6. As shown in FIG. 13, drive mechanism 226 includes drive hub 134 and teeth 136. Teeth 136 may engage teeth 138 on diverter 216. Gear 140 may engage and operate drive hub 134 and be used as the actuating mechanism for drive mechanism 226. Gear 140 may have, for example, teeth that engage teeth on drive hub 134. In some embodiments, gear 140 is a pinion gear. Gear 140 may extend outside body 202 such that the gear may be actuated external of the body.

In some embodiments, as shown in FIG. 15, drive mechanism 226 is located at or near the end of body 202 with passage 214. Diverter 216 may be coupled to drive hub 134 at or near the end of the diverter located in passage 214. Drive hub 134 may be coupled to gear 140. Gear 140 may be used as the actuating mechanism for drive mechanism 226. Gear 140 may extend outside body 202 such that the gear may be actuated external of the body.

Locating the actuating mechanism (for example, gear 140 or gear box 228) of drive mechanism 226 outside (external) of body 202 allows the actuating mechanism to be operated by any means suitable for the location of fitting 200. For example, the actuating mechanism may be operated by electric-, pneumatic-, or hydraulic-powered actuators. In certain embodiments (for example, in a subsea environment), the actuating mechanism may be operated by an ROV, ROV deployed torquing tools, or manually operated devices such as a hand wheel.

In certain embodiments, for example, the embodiments shown in FIGS. 11, 13, 19, and 20, diverter 216 and/or drive mechanism 226 are removable from body 202. Thus, diverter 216 and/or drive mechanism 226 can be removed for maintenance (e.g., cleaning and/or repair), refitting of parts, or replacement without removing fitting 200 from the pipeline. For example, diverter 216 may be removed from body 202 to refit seals and/or clean orifices and then be replaced back into the body for further operation.

In certain embodiments, for example, the embodiment shown in FIGS. 11, 19, and 20, the use of the sealed, flanged coupling between body 202, diverter 216, and drive mechanism 226 allows the drive mechanism and/or the diverter to be removed from the body. Because there is no welding used to secure diverter 216 and drive mechanism 226 to body 202, the diverter and the drive mechanism may be removed without breaking any piping or other connections to the body. For example, clamp 229 may be removed and drive mechanism 226 is uncoupled from shaft portion 216B of diverter 216. Diverter 216 may then be slid out of body 202. FIGS. 19 and 20 depict an embodiment of fitting 200 with clamp 229, diverter 216, and drive mechanism 226 uncoupled from body 202.

In some embodiments, valves are placed on ports 204, 206, 208 to allow the ports to be sealed off and fitting 200 to be isolated from other parts of the pipeline or piping system. One or more of the valves on ports 204, 206, 208, or another valve on body 202, may be used to purge the inside of the body prior to removing diverter 216 and/or drive mechanism 226.

In some embodiments, an extraction device is attached to body 202 before removing diverter 216 and/or drive mechanism 226. The extraction device may allow diverter 216 and/or drive mechanism 226 to be removed without depressurizing fitting 200. For example, the extraction device may include a chamber or other enclosure attached to body 202 that creates a pressurized working area around the end of the body from which diverter 216 and/or drive mechanism 226 are removed. The pressurized working area may include other features that allow for maintenance (e.g., cleaning and/or repair), refitting of parts, or replacement of diverter 216 and/or drive mechanism 226 without depressurizing fitting 200.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a bolt" includes a combination of two or more bolts and reference to "a fluid" includes mixtures of fluids.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A fitting, comprising:
   a body comprising:
      at least two separate openings on a first side of the body, wherein the at least two separate openings on the first side couple to corresponding separate passages in the body that converge to a common passage in the body;
      an opening on a second side of the body opposite from the first side of the body, wherein the opening couples to the common passage; and
      a bore in a part of the body between the at least two separate passages, the bore being concentric with the common passage;
   a diverter, wherein at least a portion of the diverter is located in both the bore and the common passage during use, and wherein a first end portion of the diverter is coupled to a drive mechanism on the first side of the body, and a second end portion of the diverter, opposite to the first end portion, comprises a tubular portion with an end of the tubular portion being open and in fluid communication with the common passage, and wherein at least part of the diverter in the bore tightly fits in the bore; and
   one or more seals positioned circumferentially around the part of the diverter that tightly fits in the bore;
   wherein the wall of the tubular portion of the diverter comprises an opening, and wherein the diverter is selectively rotated with the drive mechanism during use to align the diverter wall opening with a selected separate passage such that an object moving from the common passage through the tubular portion of the diverter is directed into the selected separate passage during use; and
   wherein the tubular portion of the diverter comprises orifices that allow at least some fluid flow between the separate passages not aligned with the wall opening and the common passage to equalize pressure between the passages, and wherein the orifices inhibit object flow between the passages.

2. The fitting of claim 1, wherein the tubular portion of the diverter comprises a shaped passage that directs the object to the selected separate passage during use.

3. The fitting of claim 1, wherein the open end of the tubular portion of the diverter allows the object to enter the inside of the tubular portion.

4. The fitting of claim 1, wherein the separate passages are oriented symmetrically about a central axis.

5. The fitting of claim 1, wherein the diverter can be selectively rotated during use to align the wall opening such that open flow is inhibited between the all of the separate passages and the common passage.

6. The fitting of claim 1, wherein the diverter can be selectively rotated to align the wall opening such that fluid flow is open between the common passage and the selected separate passage and fluid flow is inhibited between the common passage and the separate passages not aligned with the wall opening.

7. The fitting of claim 6, wherein the diverter is coupled to the body using a sealed, flanged coupling.

8. The fitting of claim 6, wherein the diverter is removable from the body while the body remains coupled to a pipeline.

9. The fitting of claim 1, wherein the drive mechanism is operable external of the body of the fitting.

10. The fitting of claim 1, wherein the drive mechanism is coupled to the first end of the diverter and the first side of body with a sealed, flanged coupling.

11. The fitting of claim 1, wherein the first end portion of the diverter comprises a shaft portion coupled to the drive mechanism.

12. The fitting of claim 11, wherein the seals are located on the shaft portion of the diverter.

13. The fitting of claim 1, wherein the fitting is configured to be coupled to a subsea pipeline.

14. A fitting, comprising:
    a body comprising:
       at least two passages in the body that converge from separate openings on a first side of the body to a single opening on a second side of the body, wherein the second side of the body is opposite from the first side of the body; and
       a bore in a part of the body between the at least two passages, the bore being concentric with the single opening;
    a diverter, wherein at least a part of the diverter is located in the bore, wherein a first end portion of the diverter is coupled to a drive mechanism on the first side of the body, and a second end portion of the diverter, opposite to the first end portion, comprises a tubular portion with an end of the tubular portion being open and in fluid communication with the single opening, and wherein at least part of the diverter in the bore tightly fits in the bore; and
    one or more seals positioned circumferentially around the part of the diverter that tightly fits in the bore;
    wherein the wall of the tubular portion of the diverter comprises an opening, and wherein the diverter is selectively rotated with the drive mechanism during use to align the diverter wall opening with a selected passage such that an object moving from the single opening through the tubular portion of the diverter is directed into the selected passage during use; and
    wherein the tubular portion of the diverter comprises orifices that allow at least some fluid flow between the passages not aligned with the wall opening and the single opening to equalize pressure between the passages and the single opening, and wherein the orifices inhibit object flow between the passages and the single opening.

15. The fitting of claim 14, wherein the tubular portion of the diverter comprises a shaped passage that directs the object to the selected passage during use.

16. The fitting of claim 14, wherein the open end of the tubular portion of the diverter allows the object to enter the inside of the tubular portion.

17. The fitting of claim 14, wherein the passages are oriented symmetrically about a central axis.

18. The fitting of claim 14, wherein the diverter can be selectively rotated during use to align the wall opening such that open flow is inhibited between the all of the passages and the single opening.

19. The fitting of claim 14, wherein the diverter can be selectively rotated to align the wall opening such that fluid flow is open between the single opening and the selected passage and fluid flow is inhibited between the single opening and the passages not aligned with the wall opening.

20. The fitting of claim 14, wherein the diverter is coupled to the body using a sealed, flanged coupling.

21. The fitting of claim 14, wherein the diverter is removable from the body while the body remains coupled to a pipe line.

22. The fitting of claim 14, wherein the drive mechanism is operable external of the body of the fitting.

23. The fitting of claim 14, wherein the drive mechanism is coupled to the first end of the diverter and the first side of body with a sealed, flanged coupling.

24. The fitting of claim 14, wherein the first end portion of the diverter comprises a shaft portion coupled to the drive mechanism.

25. The fitting of claim 24, wherein the seals are located on the shaft portion of the diverter.

26. The fitting of claim 14, wherein the fitting is configured to be coupled to a subsea pipeline.

\* \* \* \* \*